(12) United States Patent
Yan et al.

(10) Patent No.: US 10,805,572 B2
(45) Date of Patent: Oct. 13, 2020

(54) DISPLAY WITH DETACHABLE SCREEN

(71) Applicant: THALES CETC AVIONICS CO., LTD., Chengdu, Sichuan (CN)

(72) Inventors: Zhijian Yan, Sichuan (CN); Min Liu, Sichuan (CN); Hanjun Kou, Sichuan (CN); Hongchuan Deng, Sichuan (CN); Kui Zhou, Sichuan (CN); Zhenhua Song, Sichuan (CN); Dake Liao, Sichuan (CN)

(73) Assignee: THALES CETC AVIONICS CO., LTD., Chengdu, Sichuan (CN)

( * ) Notice: Subject to any disclaimer, the term of this patent is extended or adjusted under 35 U.S.C. 154(b) by 19 days.

(21) Appl. No.: 15/628,906

(22) Filed: Jun. 21, 2017

(65) Prior Publication Data
US 2018/0041732 A1 Feb. 8, 2018

(30) Foreign Application Priority Data

Aug. 8, 2016 (CN) .......................... 2016 1 0645281

(51) Int. Cl.
*G06F 1/16* (2006.01)
*G06F 1/20* (2006.01)
(Continued)

(52) U.S. Cl.
CPC ........... *H04N 5/64* (2013.01); *B60R 11/0235* (2013.01); *F16M 11/10* (2013.01); *F16M 11/16* (2013.01);
(Continued)

(58) Field of Classification Search
CPC ........ B60R 11/0235; B60R 2011/0028; B60R 2011/0078; B60R 2011/0082;
(Continued)

(56) References Cited

U.S. PATENT DOCUMENTS 5,583,529 A * 12/1996 Satou .................... G06F 1/1616
345/87
2004/0075639 A1 * 4/2004 Lester ................. B60R 11/0235
345/156
(Continued)

FOREIGN PATENT DOCUMENTS

CN 1601655 A 3/2005
CN 1912796 A 2/2007
(Continued)

OTHER PUBLICATIONS

The 2nd Chinese Office Action along with the English Summary regarding Application No. CN201610645281.5 dated Apr. 2, 2018.
(Continued)

*Primary Examiner* — Jamie J Atala
*Assistant Examiner* — Patrick E Demosky
(74) *Attorney, Agent, or Firm* — Yue (Robert) Xu; Apex Attorneys at Law, LLP

(57) ABSTRACT

A display with a detachable screen according to the present application includes a servo body and a display screen, the display screen is electrically connected to the servo body via an electric wire, the display screen is detachably connected to the servo body, and the servo body drives the display screen to move between an unfolded position and a folded position, and the electric wire is detachably connected to the display screen. The display with the detachable screen according to the present application has a simple and compact structure and occupies a small volume, and the assembling and disassembling is convenient and efficient, the display screen can be separately detached from the servo body easily, thus it is convenient to independently maintain and replace the display screen without the complicated process of detaching the entire display from an interior trimming panel of a luggage rack of a passenger aircraft.

5 Claims, 2 Drawing Sheets

(51) Int. Cl.
*H04N 5/64* (2006.01)
*F16M 11/10* (2006.01)
*B60R 11/02* (2006.01)
*F16M 11/16* (2006.01)
*F16M 13/02* (2006.01)
*B60R 11/00* (2006.01)
*B64D 11/00* (2006.01)

(52) U.S. Cl.
CPC ......... *F16M 13/027* (2013.01); *G06F 1/1601* (2013.01); *G06F 1/1607* (2013.01); *G06F 1/1654* (2013.01); *G06F 1/1681* (2013.01); *G06F 1/1683* (2013.01); *B60R 2011/0028* (2013.01); *B60R 2011/0078* (2013.01); *B60R 2011/0082* (2013.01); *B60R 2011/0085* (2013.01); *B60R 2011/0092* (2013.01); *B64D 11/0015* (2013.01)

(58) Field of Classification Search
CPC .... B60R 2011/0085; B60R 2011/0092; F16M 11/10; F16M 11/16; F16M 13/027; G06F 1/1601; G06F 1/1607; G06F 1/1654; G06F 1/1683; G01F 1/1681; B64D 11/0015
See application file for complete search history.

(56) References Cited

U.S. PATENT DOCUMENTS

| | | | | |
|---|---|---|---|---|
| 2007/0076363 | A1* | 4/2007 | Liang | G06F 1/1601 361/679.29 |
| 2009/0152417 | A1* | 6/2009 | Vitito | B60K 37/06 248/205.1 |
| 2011/0075335 | A1* | 3/2011 | Nagami | F16M 11/08 361/679.01 |
| 2018/0041732 | A1* | 2/2018 | Yan | B60R 11/0235 |

FOREIGN PATENT DOCUMENTS

| | | |
|---|---|---|
| CN | 202058385 U | 11/2011 |
| CN | 203757308 U | 8/2014 |
| JP | 2004-155291 A | 6/2004 |

OTHER PUBLICATIONS

First Chinese Office Action regarding Application No. 201610645281.5 dated Sep. 27, 2017. English Translation provided by http://globaldossier.uspto.gov.

Extended European Search Report for corresponding Application No. 17168493.9, dated Oct. 9, 2017.

\* cited by examiner

DISPLAY WITH DETACHABLE SCREEN

CROSS-REFERENCE TO RELATED APPLICATIONS

This application claims the benefit of priority to Chinese Patent Application No. 201610645281.5, titled "DISPLAY WITH DETACHABLE SCREEN", filed with the Chinese State Intellectual Property Office on Aug. 8, 2016, the entire disclosure of which is incorporated herein by reference.

FIELD

The present application relates to the technical field of connection structures for display screens, and particularly to a display with a detachable screen.

BACKGROUND

An onboard hanging-type display for aircrafts and passenger cars mainly includes a servo body and a display screen. Generally, the servo body is embedded inside an interior trimming panel of a luggage rack of a passenger aircraft. When in use, the display screen is driven by a driving mechanism in the servo body to rotate about an axis, to be unfolded and to display onboard entertainment information. On the contrary, when not in use, the display screen is driven by the driving mechanism to rotate about the axis, to be retracted and hidden.

However, currently, such onboard hanging-type display usually has a structure with a non-detachable screen. When the display screen needs to be replaced and maintained due to wear, the entire hanging-type display needs to be detached from the interior trimming panel of the luggage rack of the passenger aircraft before disassembling the components of the display to replace and maintain the display screen. The assembling and disassembling process of a traditional onboard hanging-type display is complicated, resulting in a long maintenance time and high maintenance costs.

SUMMARY

The technical problem to be solved and the technical task proposed by the present application are to improve the conventional technology, to provide a display with a detachable screen, which addresses the issues in the conventional technology that, a display screen cannot be separately detached from a conventional onboard hanging-type display and the entire onboard hanging-type display needs to be detached from an interior trimming panel of a luggage rack of a passenger aircraft, resulting in the complicated assembling and disassembling process and a low maintenance efficiency.

In order to solve the above technical problem, the technical solution of the present application is described as follows.

A display with a detachable screen includes a servo body and a display screen, the display screen is electrically connected to the servo body via an electric wire, the display screen is detachably connected to the servo body, and the servo body is configured to drive the display screen to move between an unfolded position and a folded position, and the electric wire is detachably connected to the display screen. The display with the detachable screen according to the present application can realize the normal functions of folding or unfolding the display screen, and further, the electrical connection and the mechanical connection between the servo body and the display screen are both embodied as detachable structures, thus it is convenient to completely separately detach the display screen from the servo body, and the display screen can be easily and separately maintained and replaced without the complicated process of detaching the entire display from an interior trimming panel of a luggage rack of a passenger aircraft, thereby greatly shortening a maintenance time, reducing a labor intensity, improving a maintenance efficiency and reducing maintenance costs.

Further, the servo body is provided with a rotating shaft, the display screen is fixedly provided with a connecting member, the connecting member is connected to the rotating shaft, and the servo body is configured to drive the rotating shaft to rotate to allow the display screen to move between the unfolded position and the folded position. The rotating shaft has a simple structure and occupies a small space, and can easily adjust an angle of the display screen to meet requirements of different perspectives.

Further, an axial direction of the rotating shaft is in parallel with a surface of the servo body, and the rotating shaft is configured to drive the display screen to abut against the surface of the servo body to reach the folded position or drive the display screen to be unfolded.

Further, the connecting member is connected to the rotating shaft by one or more of the following connecting manners: a screw connection, a snap joint, and a plug-pin connection, which is easy to detach while ensuring the stability of connection, and achieves a good anti-vibration performance and a quick assembling and disassembling process, and improves the maintenance efficiency.

Further, a screw via-hole is provided in the connecting member and a corresponding threaded hole is provided in the rotating shaft, and the connecting member is connected to the rotating shaft by a screw. This connection manner is simple and easy to operate, and the connecting structure is stable and firm to prevent the display screen from falling off.

Further, the screw is mounted between the connecting member and the rotating shaft in a captive way. Thus the screw will not fall off from the display screen, and will not be lost in maintenance. Therefore, the connecting structure is more stable and firm and the anti-vibration performance is improved, thus preventing the display screen from falling off and improving the safety of use.

Further, the rotating shaft is provided with a semi-cylindrical connecting portion which is formed by cutting the rotating shaft in an axial direction, the connecting member is provided with a semi-cylindrical connecting portion corresponding to the semi-cylindrical connecting portion of the rotating shaft, and the rotating shaft and the connecting member are spliced together to form a cylindrical structure. The connecting structure is compact, which allows the display to rotate with the rotating shaft stably.

Further, the rotating shaft is provided with a countersunk groove, a plug connector on the electric wire connected to the servo body is arranged in the countersunk groove, and a plug corresponding to the plug connector is provided on the display screen, and the plug is configured to insert into the plug connector.

Further, the countersunk groove is located on a joining face of the rotating shaft where the rotating shaft is connected to the connecting member, one end of the rotating shaft is provided with a through hole in communication with the countersunk groove, the electric wire connected to the servo body is configured to run along the through hole and the countersunk groove, and the plug corresponding to the plug connector is arranged on a joining surface of the connecting member. When the connecting member is connected to the rotating shaft, the plug and the plug connector are butt jointed to achieve the electrical connection.

Further, the servo body is provided with a flipping mechanism or a guide-rail mechanism to drive the display screen to move, which allows the display screen to be easily folded when it is not in use without occupying external spaces, and facilitates the movement of passengers and also avoids the display screen being damaged accidentally by the movement of passengers.

Compared with the conventional technology, the present application has the following advantages:

The display with the detachable screen according to the present application has a simple and compact structure, occupies a small volume, and is convenient to assemble and disassemble with a high efficiency, and it is convenient to completely detach the display screen from the servo body, thus the display screen can be separately maintained and replaced easily without the complicated process of detaching the entire display from an interior trimming panel of a luggage rack of a passenger aircraft, thereby greatly shortening a maintenance time, reducing a labor intensity, improving a maintenance efficiency and reducing maintenance costs. In addition, the connection is firm and the anti-vibration performance is good, which can effectively avoid the occurrence of disconnection, to protect personnel safety and also avoid the connected devices from falling off and being damaged.

DETAILED DESCRIPTION

The technical solution according to the embodiments of the present application will be described clearly and completely as follows in conjunction with the drawings of the embodiments of the present application. It is apparent that the described embodiments are only a few of the embodiments rather than all of the embodiments of the present application. Any other embodiments obtained by those skilled in the art based on the embodiments in the present application without any creative work fall in the scope of protection of the present application.

A display with a detachable screen is provided according to the embodiments of the present application, a display screen of the display can be separately and quickly mounted and detached, without detaching a servo body from an interior trimming panel of a luggage rack of a passenger aircraft, thus the assembling and disassembling process is simple, the maintenance efficiency is high, and the maintenance cost is low, which can ensure that aviation machine sets can meet the shipping demand in time.

Figure 1:
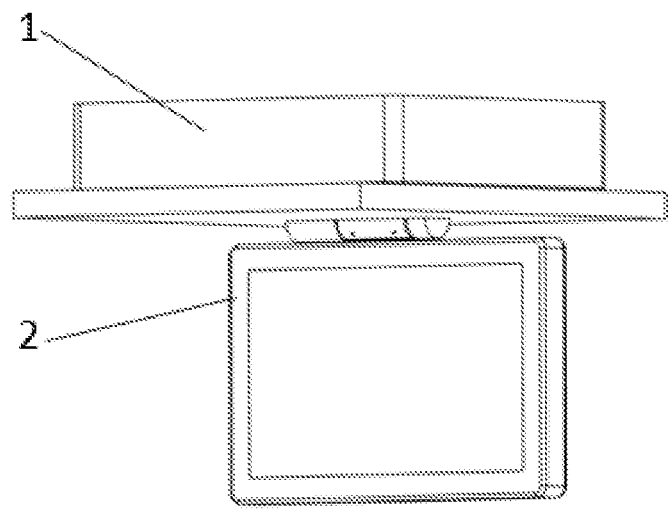
FIG. 1 is a schematic view showing the structure of a display according to the present application when it is assembled.
Figure 2:
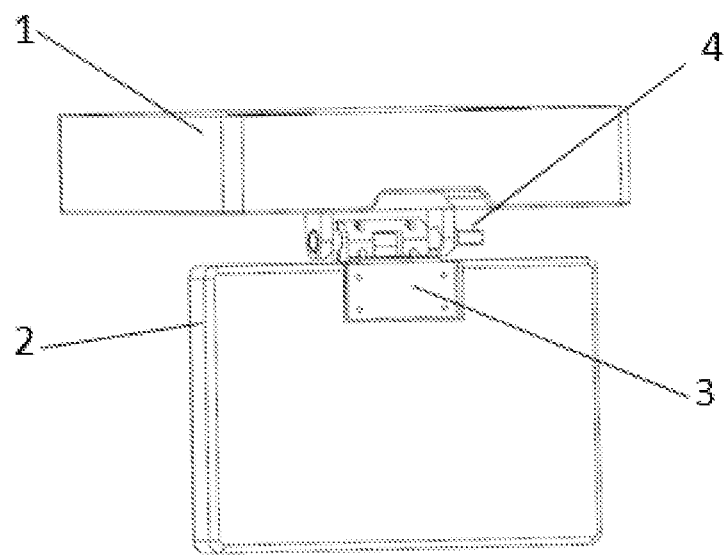
FIG. 2 is a schematic rear view showing the structure of FIG. 1.
Figure 3:
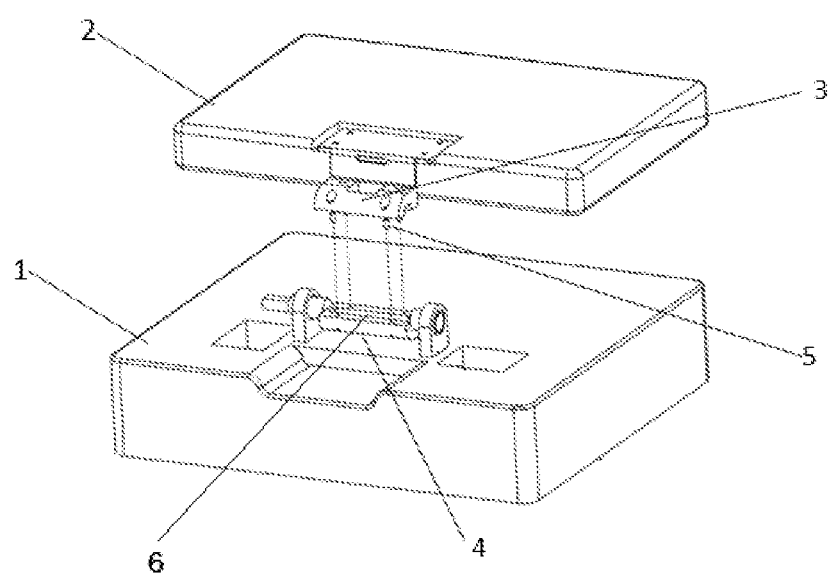
FIG. 3 is an exploded schematic view showing the structure of the display according to the present application.

As shown in FIGS. 1 to 3, a display with a detachable screen includes a servo body 1 and a display screen 2, the servo body 1 and the display screen 2 are electrically connected via an electric wire. The display screen 2 is detachably connected to the servo body 1, and the servo body 1 drives the display screen 2 to move between an unfolded position and a folded position. The detachable connecting structure can be embodied as a screw connection, a snap joint or a plug-pin connection, which can be easily detached while achieving a stable connection, to improve the maintenance efficiency. The screw connection has a good connection stability, a good anti-vibration performance and can effectively prevent disengagement. The snap joint and the plug-pin connection allow a fast assembling and disassembling process and a high maintenance efficiency. The servo body 1 is provided with a flipping mechanism or a guide-rail mechanism to drive the display screen 2 to be folded and unfolded, and the display screen 2 can move with respect to the servo body 1 in a vertical direction, a horizontal direction, obliquely or in a direction of a curve, to be folded or unfolded, thus the display screen 2 can be effectively accommodated when it is not in use, to avoid occupying too much space that may affect the movement of passengers, and also the display screen 2 itself can be protected to avoid being damaged accidentally by the movement of passengers.

In this embodiment, the servo body 1 is provided with the flipping mechanism to drive the display screen 2 to move. The servo body 1 is provided with a rotating shaft 4, and an axial direction of the rotating shaft 4 is in parallel with a surface of the servo body 1. A connecting member 3 is riveted on the display screen 2. The display screen 2 is connected to the rotating shaft 4 via the connecting member 3. The rotating shaft 4 drives the display screen 2 to rotate in a direction perpendicular to the surface of the servo body 1. The rotating shaft 4 drives the display screen 2 to abut against the surface of the servo body 1 to reach the folded position, or drives the display screen 2 to be unfolded outwardly.

Also, in this embodiment, a screw-type detachable structure is used between the connecting member 3 and the rotating shaft 4. A screw via-hole is provided in the connecting member 3 and a corresponding threaded hole is provided in the rotating shaft 4. The connecting member 3 and the rotating shaft 4 are connected by a screw 5, and the screw 5 is embodied as a captive screw, to further ensure the stability of the connecting structure, improve the anti-vibration performance, avoid disengagement, and improve the safety of use.

In order to improve the compactness of the structure, the rotating shaft 4 is provided with a semi-cylindrical connecting portion which is formed by cutting the rotating shaft 4 in an axial direction, and the connecting member 3 is provided with a semi-cylindrical connecting portion corresponding to the semi-cylindrical connecting portion of the rotating shaft 4. The rotating shaft 4 and the connecting member 3 are jointed to form a cylindrical structure. In addition, the rotating shaft 4 is provided with a countersunk groove 6, and the countersunk groove 6 is located on a joining surface of the rotating shaft 4 where the rotating shaft 4 is connected to the connecting member 3. One end of the rotating shaft 4 is provided with a through hole in communication with the countersunk groove 6, and the electric wire connected to the servo body 1 runs along the through hole and the countersunk groove 6. A plug connector provided on the electric wire is arranged in the countersunk groove 6, and a plug corresponding to the plug connector is provided on the joining surface of the connecting member 3. The plug is electrically connected to the display screen 2, thus when the connecting member 3 is connected to the rotating shaft 4, the plug and the plug connector are butt jointed to achieve the electrical connection, which improves the convenience of operation. Moreover, after the rotating shaft 4 and the connecting member 3 are spliced together, the plug and the plug connector are enclosed by the rotating shaft 4 and the connecting member 3, to protect the connection between the plug and the plug connector, thus the plug and plug connector are prevented from being exposed outside and disconnected due to vibration or accidental touch by human, a stable electrical connection of the display can be ensured, and the reliability of use of the display can be improved.

When the display screen 2 needs to be detached, either in the unfolded state shown in FIGS. 1 and 2 or in the folded state shown in FIG. 3, the screw 5 can be unscrewed with a screwdriver to detach the foldable display screen 2 from the servo body 1. The plug and the plug connector on the electric wires are disconnected while the connecting member 3 is separated from the rotating shaft 4, thus the display screen 2 can be conveniently maintained and replaced, and the re-installation of the display screen 2 can be carried out reversely in a similar principle.

In other embodiments, the connection between the connecting member 3 and the rotating shaft 4 can be only used as a structural connection for transmission. The structural separation of the servo body 1 and the display screen 2 can be achieved by detaching the connecting member 3 from the rotating shaft 4. Moreover, the display screen 2 is electrically connected to the servo body 1 by an electric wire separately provided outside the connecting member 3 and the rotating shaft 4, and a plug and a plug connector, which are easy to be mounted and detached, are provided on the electric wires. In maintenance and replacement, it is also required to separate the plug and the plug connector on the electric wires from each other.

The above embodiments are only preferred embodiments of the present application. It should be noted that, the preferred embodiments described above should not be considered as limiting the present application. The scope of protection of the present application is defined by claims. For those skilled in the art, a few of improvements and modifications may also be made without departing from the spirit and scope of the present application. These improvements and modifications should also be deemed to fall within the scope of protection of the present application.

What is claimed is:

1. A display with a detachable screen, comprising;
    a servo body with a rotating shaft;
    an electric wire connected to the servo body; and
    a display screen fixedly provided with a connecting member detachably connected to the rotating shaft of the servo body, wherein the servo body is configured to drive the rotating shaft to rotate to allow the display screen to move between an unfolded position and a folded position, and
    a side, facing the display screen, of the rotating shaft and a side, facing the servo body, of the connecting member are respectively provided with a first semi-cylindrical connecting portion and a second semi-cylindrical connecting portion which are spliced together to form a cylindrical structure and are connected by a screw, and the first semi-cylindrical connecting portion is directly formed in the rotating shaft on the side facing the display screen by cutting the rotating shaft in an axial direction; and
    a joining face of the rotating shaft where the rotating shaft is connected to the connecting member is provided with a countersunk groove, a plug connector on the electric wire connected to the servo body is arranged in the countersunk groove, and a plug corresponding to the plug connector and electrically connected to the display screen is arranged on a joining surface of the connecting member, and the plug is configured to insert into the plug connector; and
    wherein, when the rotating shaft and the connecting member are connected, the plug is inserted into the plug connecter, and the display screen and the servo body are mechanically and electrically connected.

2. The display with the detachable screen according to claim 1, wherein an axial direction of the rotating shaft is in parallel with a surface of the servo body, and the rotating shaft is configured to drive the display screen to abut against the surface of the servo body to reach the folded position or drive the display screen to be unfolded.

3. The display with the detachable screen according to claim 1, wherein a screw via-hole is provided in the connecting member and a corresponding threaded hole is provided in the rotating shaft.

4. The display with the detachable screen according to claim 3, wherein the screw is mounted between the connecting member and the rotating shaft in a captive way.

5. The display with the detachable screen according to claim 1, wherein one end of the rotating shaft is provided with a through hole in communication with the countersunk groove, and the electric wire connected to the servo body is configured to run along the through hole and the countersunk groove.

* * * * *